(12) United States Patent
Mullen

(10) Patent No.: US 7,224,934 B2
(45) Date of Patent: May 29, 2007

(54) TALKING BOOK EMPLOYING PHOTOELECTRONICS FOR AUTONOMOUS PAGE RECOGNITION

(76) Inventor: Jeffrey D Mullen, 1 Mercer Ct., Scarsdale, NY (US) 10583

( * ) Notice: Subject to any disclaimer, the term of this patent is extended or adjusted under 35 U.S.C. 154(b) by 561 days.

(21) Appl. No.: 10/370,169

(22) Filed: Feb. 19, 2003

(65) Prior Publication Data

US 2003/0170604 A1 Sep. 11, 2003

Related U.S. Application Data

(60) Provisional application No. 60/361,849, filed on Mar. 5, 2002.

(51) Int. Cl.
*G09B 5/00* (2006.01)

(52) U.S. Cl. .................. 434/317; 434/308; 345/901

(58) Field of Classification Search ............ 434/178, 434/307 R–309, 317, 319, 322, 365; 345/901, 345/87, 101, 156, 173, 204, 206; 40/124.02, 40/455; 715/839; 340/568.1; 358/1.12; 235/375
See application file for complete search history.

(56) References Cited

U.S. PATENT DOCUMENTS

| | | | |
|---|---|---|---|
| 2,945,307 A | 7/1960 | Kallman | |
| 2,997,306 A | 8/1961 | Hicks | |
| 3,086,297 A | 4/1963 | Kay | |
| 3,273,894 A | 9/1966 | Clawson | |
| 3,295,670 A | 1/1967 | Busm et al. | |
| 3,782,734 A | 1/1974 | Krainin | |
| 4,021,932 A | 5/1977 | Lipps | |
| 4,299,041 A * | 11/1981 | Wilson | 40/124.02 |
| 4,636,881 A | 1/1987 | Brefka et al. | |
| 4,656,469 A * | 4/1987 | Oliver et al. | 345/101 |
| 4,703,573 A * | 11/1987 | Montgomery et al. | 40/455 |
| 4,809,246 A * | 2/1989 | Jeng | 434/317 |
| 4,884,974 A | 12/1989 | DeSmet | |
| 4,990,092 A | 2/1991 | Cummings | |
| 5,290,190 A | 3/1994 | McClanahan | |
| 5,368,488 A | 11/1994 | Gentile | |
| 5,374,195 A | 12/1994 | McClanahan | |
| 5,419,705 A | 5/1995 | Sandvik | |
| 5,484,292 A * | 1/1996 | McTaggart | 434/317 |
| 5,485,176 A * | 1/1996 | Ohara et al. | 345/173 |
| 5,511,980 A | 4/1996 | Wood | |
| 5,520,544 A | 5/1996 | Manico et al. | |
| 5,538,430 A * | 7/1996 | Smith et al. | 434/178 |
| 5,567,163 A | 10/1996 | Ku | |
| 5,569,868 A | 10/1996 | Leung | |
| 5,574,519 A | 11/1996 | Manico et al. | |
| 5,595,489 A * | 1/1997 | Kwon | 434/319 |
| 5,611,694 A | 3/1997 | Bromley | |
| 5,645,432 A * | 7/1997 | Jessop | 434/322 |
| 5,686,705 A | 11/1997 | Conroy et al. | |
| 5,707,240 A * | 1/1998 | Haas et al. | 434/317 |

(Continued)

*Primary Examiner*—Joe H. Cheng

(57) ABSTRACT

Systems and methods of creating talking books that employ photo-electronics to realize autonomous page recognition, are provided. More particularly, systems and methods are provided for employing one or more light sensing components (e.g., photoresistors, phototransistors, and photodiodes) on the pages of a book in order to recognize when a user is reading a particular page, or a pair of pages such that an audio segment associated to that page, or pair of pages, may be played. This invention also provides light sensing components that can recognize, and react to, user interactions with a talking book. Examples included playing a media segment or turning a particular LED ON for a particular action (e.g., covering an interacting light sensing component).

50 Claims, 8 Drawing Sheets

U.S. PATENT DOCUMENTS

| | | | |
|---|---|---|---|
| 5,748,082 A * | 5/1998 | Payne ..................... 340/568.1 |
| 5,813,861 A | 9/1998 | Wood |
| 5,839,902 A | 11/1998 | Wood |
| 5,877,458 A | 3/1999 | Flowers |
| 5,951,298 A | 9/1999 | Werzberger |
| 5,954,514 A | 9/1999 | Haas et al. |
| 6,064,384 A * | 5/2000 | Ho ............................. 715/839 |
| 6,064,855 A * | 5/2000 | Ho ............................. 434/317 |
| 6,148,173 A * | 11/2000 | Bell ........................... 434/309 |
| 6,167,233 A * | 12/2000 | Gresser et al. .............. 434/308 |
| 6,201,947 B1 * | 3/2001 | Hur et al. ................... 434/317 |
| 6,217,405 B1 | 4/2001 | Burrows |
| 6,327,459 B2 * | 12/2001 | Redford et al. ......... 434/307 R |
| 6,330,427 B1 | 12/2001 | Tabachnik |
| 6,421,524 B1 | 7/2002 | Padgett |
| 6,495,167 B2 | 12/2002 | Yang |
| 6,516,181 B1 | 2/2003 | Kirwan |
| 6,525,706 B1 * | 2/2003 | Rehkemper et al. .......... 345/87 |
| 6,668,156 B2 * | 12/2003 | Lynch et al. ................. 434/317 |
| 6,750,978 B1 * | 6/2004 | Marggraff et al. ......... 358/1.12 |
| 6,763,995 B1 * | 7/2004 | Song .......................... 235/375 |
| 6,788,283 B1 * | 9/2004 | Blotky et al. ............... 345/156 |
| 6,792,243 B2 * | 9/2004 | Ka-wah et al. .............. 434/317 |
| 6,906,705 B2 * | 6/2005 | Matsuo et al. ............... 345/206 |
| 2003/0020701 A1 * | 1/2003 | Nakamura et al. .......... 345/204 |

* cited by examiner

TALKING BOOK EMPLOYING PHOTOELECTRONICS FOR AUTONOMOUS PAGE RECOGNITION

CROSS-REFERENCE TO RELATED APPLICATION

This application claims the benefit of U.S. Provisional Patent Application No. 60/361,849, filed Mar. 5, 2002, which is herein incorporated by reference in its entirety.

BACKGROUND OF THE INVENTION

This invention relates to systems and methods of recognizing what page a book is opened to (e.g, what page a user is reading from a book). More particularly, this invention relates to recognizing the page of a book that a user is reading and subsequently playing an audio segment associated to the recognized page.

Talking books have been developed that employ mechanical schemes in order to recognize the particular page that a user is reading from a book. One example of such a mechanical talking book is present in Haas et al. U.S. Pat. No. 5,954,514 that is assigned to Eastman Kodak Company of Rochester, N.Y.

Such mechanical talking books employ thick pages, usually made out of cardboard, that are placed in a binder. These binder-pages are moved along binder rings and contain magnets that interact with stationary Hall effect sensors as the pages are turned. After a Hall effect sensor recognizes a page turning, a prerecorded message is played that is associated to the Hall effect sensor for that page. Such prior art mechanical talking books are deficient for many reasons. First, these books require large, thick, and rigid pages which ultimately limit the number of pages that can be efficiently realized in the talking book. As the number of pages increase in such books so does the complexity of the book's design. For example, numerous magnets may be required to be placed in specific locations on a page so that when a page is turned, a specific magnet passes over a specific Hall effect sensor. The number of pages, therefore, are limited to the number of Hall effect sensors that can be placed on the binder.

Furthermore, magnets have to extend from each page, thereby increasing the book's size. Moreover, these magnets only interact with the Hall effect sensors as the pages are turned. If a user opens such a book to a random page, by opening one bulk of pages to the left of the book's spine and one bulk of pages to the right of the book's spine, the book has no way to distinguish what page the book is opened to. Such conventional talking books do not have autonomous page recognition because these books sense when a page is turned to, not when a page is viewable to the user.

Talking books have also been developed that use infrared detection schemes to recognize when a page is turned. One example of an infrared talking book can be found in Brefka et al. U.S. Pat. No. 4,636,881 that is assigned to James T. Shaw of Sagaponack of New York.

Infrared talking books are at a disadvantage because they have to keep track of the number of pages that have been turned. As a result, if a user would like to begin reading from page 50 then that user would have to begin on page 1 and turn each page individually, making sure that each page was recognized, until page 50 was reached. If the first 50 pages were simply turned at the same time in a group, the talking book would only recognize a single page as being turned and, as a result, the wrong audio-segment would be played.

Other non-autonomous talking books have also been developed that rely on user-interactions with the book or desired page to output the desired audio segment. One example of such a non-autonomous talking book can be seen in Tabachnik et al. U.S. Pat. No. 6,330,427. Here, resistors of varying valued resistors are located on each page so that when a user touches an audio device to a resistor having a particular resistance, an audio segment associated to that particular resistance is played.

Non-autonomous talking books are deficient because they require the user to interact with the book, such as turning the book's pages or interacting with a page's resistive sensor, in order to hear an audio segment for a particular page or portion of a page.

It is therefore desirable to provide systems and methods for improved talking and interactive books. More particularly, is therefore desirable to realize an autonomous talking book that does not require any specific actions by the user (e.g., touching an audio device to the pages or specifically turning the pages). Such an autonomous talking book would be capable of recognizing which page, or pair of pages, is in an open position without any special handling of the book.

SUMMARY OF THE INVENTION

It is an object of the present invention to provide systems and methods for realizing autonomous page-recognition in books. More particularly, it is an object of the present invention to employ light sensors, such as photoresistors or photodiodes, in books such that a page is autonomously recognized as being open to when light shines on that page.

In preferred embodiments, the present invention employs light sensors on the pages of a talking book. Audio segments are associated to every page, or pair of pages, such that if light shines on a page, an audio segment associated to that page plays. In this manner, a user can open a talking book of the present invention to any page by using any opening method and still have the appropriate audio segment played. Thus, autonomous page recognition is realized. Because light sensors are employed on or in the pages, a page of the present invention is preferably thinner than a page of traditional talking books. In preferred embodiments, a page is approximately as thick as the employed light sensing component. Currently, the active area of light sensing components can be fabricated to the thickness of a standard piece of paper.

One or more light sensors may be placed on any one page or pair of pages. A delay may be incorporated into the book's functionality such that a sensor, or array of sensors, has to recognize the most light for a period of time (e.g., 1–5 seconds) before an audio segment associated to that sensor, or array of sensors, is played. Such a delay would allow a user to turn to a particular page without having to listen to the audio segments associated to the recently turned pages.

The electronics that operate the book are preferably stored in either the book's binding or covers. In doing so, a talking book constructed in accordance with the principles of the present invention can have both the size and the appearance of any non-talking book.

The audio associated to a page can take a variety of forms and, depending on the audio segment's format, can achieve a variety of different talking books. For example, the talking book can output an audio version of the text located on a particular page or set of pages. In this manner, the present invention could be utilized to teach young children to read. Such a book could also be utilized, for example, to read to people that have difficulty in seeing the text of a book.

Additionally, some books, such as user manuals, usually are read while the user is performing some act. For example, a cook book contains pages with recipes. A reader of a cookbook occasionally attempts to do two things at once, read the book and carry out the recipe. A talking book of the present invention that employs text-associated audio segments can relieve one of the burdens that a cookbook user has; the necessity to physically read and re-read the instructions. Thus, an audio segment may be repeated if the playing of the audio segment completes and the user is still recognized as reading the same page.

Furthermore, if the audio segments are associated to the text of a book's pages then the text of the pages may be removed altogether. Thus, a book's whimsical and festive nature could be noticeably increased as a result of this alteration. For example, people buy traditional art books in a museum so that they can see the paintings in the museum at any time. However, such traditional art books usually have only small representations of the paintings because descriptive text is required for each painting. Yet, an art talking book of the present invention may eliminate text entirely. Thus, a talking book of the present invention may contain page-size representations of the paintings. If the amount of memory in which the media segments (e.g., a segmented audio version of the tour of the museum's collection contained in the book) associated to each page is large enough, the amount of description that can be stored in audio can easily surpass the amount of description that can be provided as text in a traditional art book.

Additional photo-electronic components may be employed in a talking book of the present invention to create an interactive talking book. For example, interactive light sensors may be placed on a page so that if a user "presses" a light sensor (e.g., covers the light sensor so that it does not recognize any light) an audio-segment associated with this action may be played. Additionally, the duration of how long a sensor is covered may be utilized to control what audio segment is played. The principles of the present invention can be migrated to other mediums such as, for example, magazines, newspapers, pamphlets, puzzles, maps, and binders.

As in another embodiment, he electronics of a talking book of the present invention may be removable from and insertable into other talking books. In such embodiments, a user would only need a single electronic binding that is compatible with a variety of light sensing books and associated memory components.

BRIEF DESCRIPTION OF THE DRAWING

The above-mentioned objects and features of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
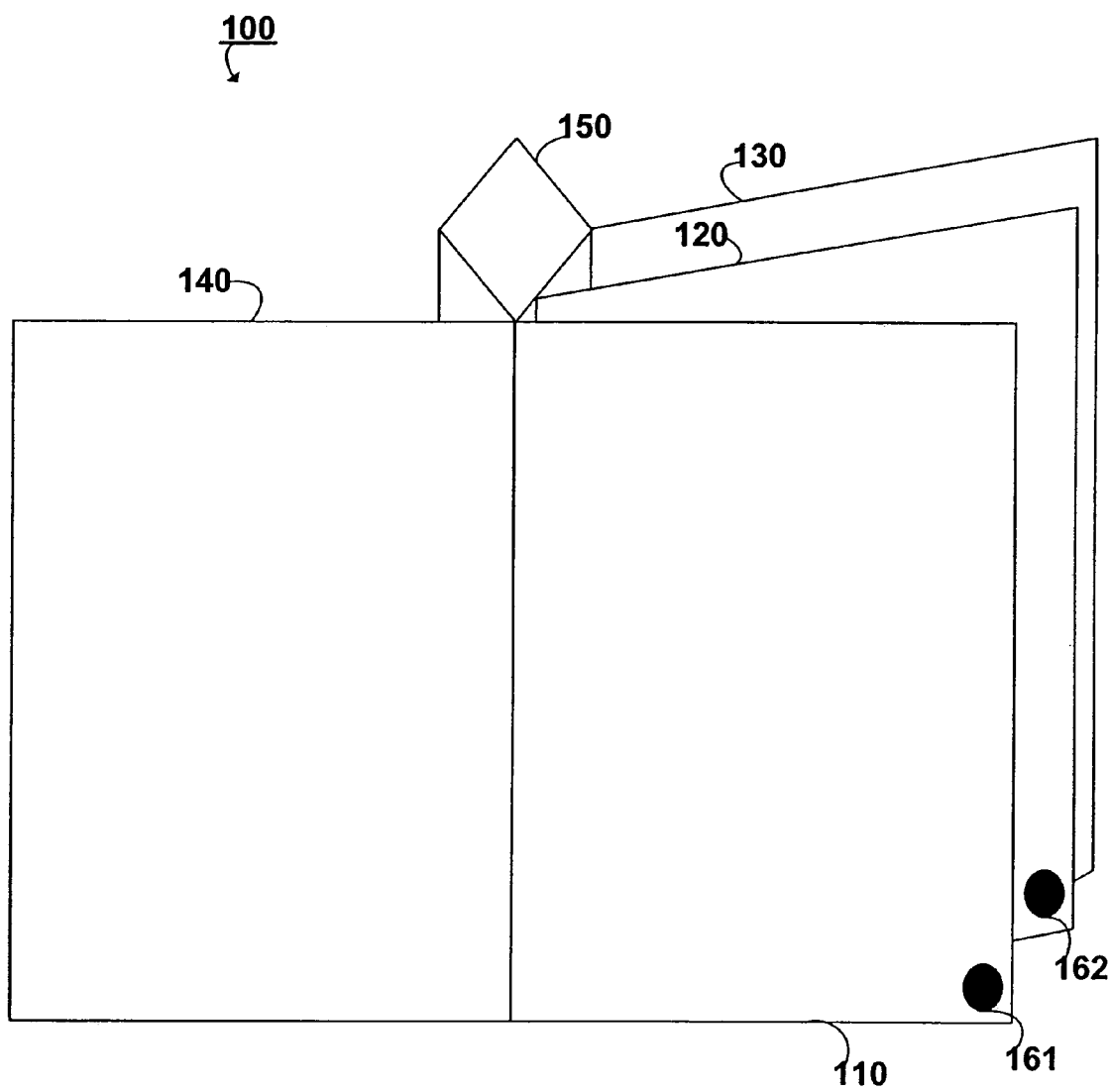
FIG. 1 is an illustration of a talking book employing photo sensors constructed in accordance with the principles of the present invention.

FIG. 1 depicts talking book 100 that employs any number of light sensors 161 and 162 on any number of pages (e.g., pages 110 and 120) to determine which page, or pair of pages, is being read by a user. Persons skilled in the art will appreciate that any type of light sensing or light sensitive component or material may be used to sense the amount of light that is exposed to the pages of talking book 100. Light sensors 161 and 162 may be, for example, photodiodes, photoresistors, phototransistors, solar cells, photomultiplier tubes, or any other type of light sensor.

In preferred embodiments, talking book 100 recognizes what page is opened to (e.g, what page is being read by a user) by sensing what page is exposed to the most amount of light. Talking book 100 may also be configured to recognize an OPEN page by determining which page or pages are receiving any light past a particular threshold. After the particular page, or pair of pages, is recognized as being OPEN, talking book 100 may perform an action associated to that page. For example, talking book 100 may play an audio or media clip associated to that page. Electronics and other components needed for the operation of talking book 100 may be stored in either book binding 150, front cover 140, back cover 130, or any other area of talking book 100.

Persons skilled in the art will appreciate that when book 100 is opened, two pages may be exposed to light. For example, if page 120 is being read by a user, the reverse side of page 110 (not shown) may also be exposed. Yet, one page may be exposed if talking book 100 is folded so only page 120 faces the user and thus, preferably, receives the most light. As per another example, front cover 140 may not contain light sensors or text. Thus, only one page, the front of page 110 would be visible to a user when front cover 140 is first opened. Light sensors 161 and 162 may, therefore, be located on multiple pages, multiple sides of pages, between pages on binding 150, front cover 140, back cover 130, or any other area of talking book 150 in order to better recognize what pages of book 100 are being read by a user.

Light sensors 161 and 162 may also be employed in multiple configurations on a page of book 100 in order to take a more accurate reading of light falling onto the page, capturing the way a user is holding and operating the book, and recognizing what page talking book 100 is opened to. In this manner, if multiple light sensors are present on a page, the average light from this array may be used to determine if the page, or pair of pages, is being read by a user.

As previously mentioned, audio clips may be associated to light sensors 161 and 162. For example, audio corresponding to page 110 may be associated to light sensor 161. Audio corresponding to page 120 may be associated to light sensor 162. Thus, when page 110 is opened to, talking book 100 will preferably play the audio segment associated to light sensor 161. When page 120 is opened to, talking book 100 will preferably play the audio segment associated to light sensor 162.

Audio may correspond to multiple pages through a single light sensor. For example, an audio clip that contains a vocal representation of the text located on the reverse side of page 110 and front of page 120 may be associated to light sensor 162. Persons skilled in the art will appreciate that any number of pages may be included in talking book 100. Audio clips may be associated to, for example, text, images, pictures or other indicia located on the pages of talking book 100. Audio clips may be in the form of, for example, songs, readings of the text, descriptions of images, soundtracks, or oral instructions.

Multiple light sensing procedures may be utilized in talking book 100. One light sensing procedure recognizes if light sensor 161 or 162 is ON (e.g., light is hitting the sensor) and, if a light sensor is ON, plays the audio clip associated to the ON light sensor. Light sensors 161 and 162 may have tolerances or thresholds, so that at least a specific amount of light needs to be sensed in order for light sensors 161 and 162 to, for example, turn ON, conduct an appropriate amount of current to be determined as being ON, or provide a an appropriate amount of potential to be determined as being ON.

Persons skilled in the art will appreciate that multiple types of light recognizing techniques may, be utilized in accordance with the principles of the present invention. For example, light readings may be taken from all light sensors 161 and 162 that are ON or just all light sensors 161 and 162 regardless of their state. The intensity or magnitude of light from these readings may then be compared and an audio segment corresponding to the light sensor or array of sensors that has sensed the brightest light may be played. As per another technique, the amount of light that is read by a light sensor or array of sensors may be averaged over a period of time (e.g., 1–5 seconds). After the sampling period ends, the averages of all sensors, or array of sensors, may be compared.

A user may sometimes turn the pages of a book in order to find a particular page. Therefore, a delay also may be integrated into talking book 100 such that undesired audio segments are not played to a user while that user turns the pages of talking book 100. This delay may take many forms. In one embodiment, the delay may be configured so that a light sensor, or an array of light sensors, has to read the most light for a given period of time (e.g., 1–5 seconds).

Persons skilled in the art will appreciate that control, audio playing devices, and memory are also preferably included in talking book 100 (e.g., in binding 150). Generally, the audio segments will be stored in memory and played through an audio playing device when the control circuitry chooses, by comparing the measurements from the light sensors, what page or pair of pages is OPEN to a user. A button may also be included on talking book 100 (shown in FIG. 2) to toggle between pages when a pair of pages is being recognized as being OPEN. This toggle button would toggle the audio being played to a user between the audio segments associated to the two OPEN pages. The operation of the control circuitry, memory, and audio playing devices (e.g., speakers) will be discussed further below in more detail.

Persons skilled in the art will also appreciate that one light sensor may be used for a pair of pages. Additionally, multiple light sensors may be incorporated on each page where some of these light sensors face one side of the page (e.g., measures light from the front of the page) while the rest of the light sensors face the reverse side of the page (e.g., measures light from the back of the page).

Figure 2:
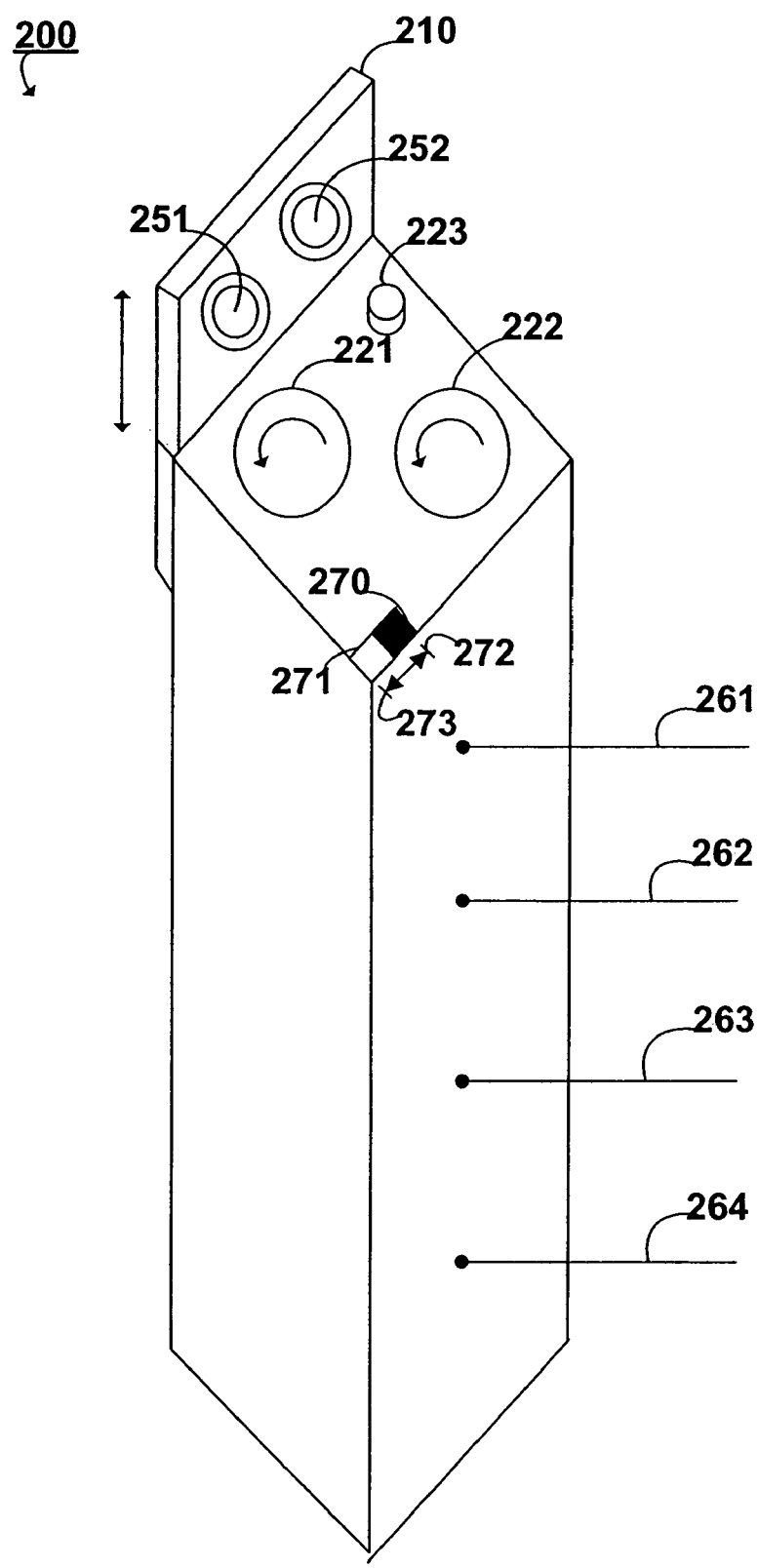
FIG. 2 is an illustration of a book binding for a talking book constructed in accordance with the principles of the present invention.

FIG. 2 depicts book binding 200 that may be employed in a talking book constructed in accordance with the principles of the present invention. Binding 200 may be utilized to house, for example, the control circuitry, memory, audio circuitry, and speakers of a talking book.

ON/OFF switch 270 may be included on book binding 200 in order to turn a talking book ON or OFF. For example, ON/OFF switch 270 may be used to determine if power is being supplied to the talking book. ON/OFF switch 270 may slide between two positions (e.g., positions 272 and 273) on track 271. Each one of positions 272 or 272 may correspond to either an ON or OFF functionality. Persons skilled in the art will appreciate that talking book 200 does not need ON/OFF switch 270 to turn ON and OFF. Instead, talking book 200 may be configured to automatically turn on when an interior light sensor (e.g. a light sensor on a page) measures a meaningful amount of light. Similarly, talking book 200 may be automatically be turned OFF if none of the interior light sensors measure any meaningful amount of light for a period of time.

Volume control 221 may be included on book binding 200 and may be used by a user to control the volume of the audio played. Similarly, speed control 222 may be included on binding 200 and may be used by a user to control the speed of the audio being played. Other buttons also may be included to manipulate the presentation of audio played by a talking book. For example, one child user may appreciate the audio book to be in a fatherly voice while another may appreciate a motherly voice. In this example, binding 200 would allow a user to change the voice to that of a mother, father, baby, teen, male, or female. Additionally, dials may be included that allow a user to change the pitch and tone of a voice manually.

If binding 200 holds circuitry or electrical components, binding 200 may include any number of wires or communication lines such as input lines 261–264. Input lines 261–264 are preferably coupled to the light sensors of the present invention and communicate the state of, or electrical readings from, the light sensors to the control circuitry contained in binding 200. The control circuitry may then determine which audio segment associated to a light sensor, array of light sensors, page, or pair of pages should, if any, be played to the user through speakers 251 and 252.

Persons skilled in the art will appreciate that additional communication lines or wires may extend from binding 200 and that multiple wires may be needed to operate, or read, a single light sensor. For example, if the light sensor was a photodiode, one embodiment may require that a terminal of the photodiode be supplied a voltage or grounded while a different terminal to be sensed for current. As per another example, light emitting diodes (LEDs) may be incorporated on a page and power control lines may be extended from book binding 200 to these LEDs. In this manner, inputs 261–264 may also take the form of output lines.

Toggle button 223 may also be included on binder 200. Toggle button 223 may be utilized to control which audio segment to play if a page, or plurality of pages, is associated to multiple audio segments. For example, a pair of pages may have two audio segments associated to the pair. Each audio segment, however, may only correspond to a single page. Thus, a user may utilize toggle button 223 to toggle between these two audio segments. If toggle button 223 is not utilized by a user, binding 200 would preferably play the audio segment associated to the earlier page in the book and then automatically play the audio segment associated to the later page in the book.

Speakers 251 and 252 may be included on binding 200. Speakers may be included anywhere on binding 200 and in some embodiments may be extendable from binding 200 through extendable speaker segment 210. Persons skilled in the art will appreciate that any number of speakers may be employed in a talking book of the present invention. Furthermore, the functionality of binding 200 may be included into other areas of a talking book, such as the book covers of a talking book.

Persons skilled in the art will appreciate that a majority of the electronics of talking book 200 may be stored outside of the talking book. For example, the memory, control, and speaker circuitry may be stored in an external housing (e.g., a teddy bear). In this example, some control circuitry may still be included in the talking book to distinguish what page a book is turned to. The book may include a transmission circuit that can send information about which page is OPEN to the external circuitry housing (which would have a receiver circuit to receive the information). The circuitry in the external housing would then be able to determine which media segment to play in memory and play that media segment (e.g., an audio segment) to the user.

Figure 3:
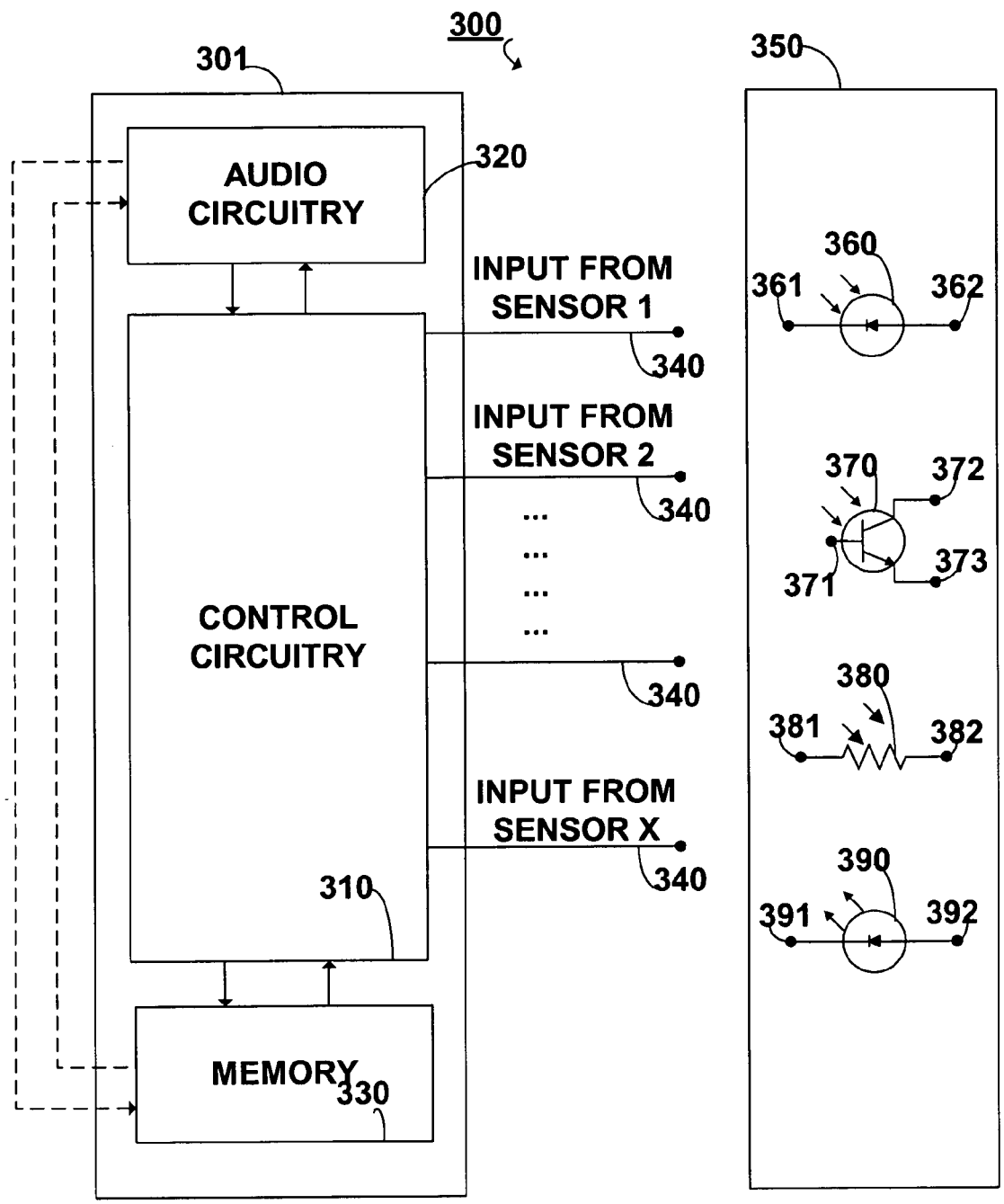
FIG. 3 is an electronic architecture for a talking book utilizing photo sensor readings as controller inputs constructed in accordance with the principles of the present invention.

FIG. 3 depicts electronic architecture 300 that may be utilized to construct a talking book in accordance with the principles of the present invention. Architecture 300 may include two separate segments, circuitry housing 301 and any number of pages 350. Page 350 may contain any number of light sensors or output devices while circuitry housing 301 contains the circuitry necessary to control and utilize the devices on page 350. Communication lines 340 are included to electrically couple these two segments together. Generally, communication lines 340 may be input wires that accept light readings from the light sensors (e.g. photodiode 360, phototransistor 370, and photoresistor 380) on page 350 or communication lines 340 may be output wires that provide control signals to electrical components (e.g., LED 390) on page 350. As a result of communication lines 340, control circuitry 310 may know, for example, what light sensors are exposed to light and how much light each sensor is exposed to.

Persons skilled in the art will appreciate that light sensors may also be included on a binding of a talking book. Such light sensors may preferably be placed between the pages of the talking book and face the direction from which a user would read the pages of a talking book. When a light sensor senses the most amount of light in this embodiment then the pages that this light sensor lies between are OPEN.

Control circuitry 310 may perform any function that is necessary for a talking book constructed in accordance with the principles of the present invention to operate. For example, control circuitry 310 may determine what page, or pair of pages, that light is being exposed to by comparing the readings from any number of light sensors and, as a result, determine what page, or pair of pages, is OPEN. Control circuitry 310 may then, for example, choose an audio clip from memory 330, by enabling a block of memory 330 that is associated to the OPEN page, or pair of pages, and enabling audio circuitry 320 to play the clip.

Persons skilled in the art will appreciate that timing functions can be performed by control circuitry 310. For example, light sensors may only be utilized by control circuitry 310 at a specific time interval in order to sense if a page has been turned, the talking book has been closed, or to continue playing an audio segment or to repeat an audio segment previously played (if the same page is still being read the user.

Audio circuitry 320 may be included in housing 301. In one embodiments, audio circuitry 320 may only be a circuitry. In more complicated embodiments, audio circuitry 320 may also include an amplifier or other sound manipulation devices. User controls that a user can utilize to manipulate sound (e.g., change the pitch, tone, or volume) of an audio segment may be included in audio circuitry 320.

Persons skilled in the art will appreciate that audio circuitry 320 is not limited to just presenting audio to a user. Moreover, audio circuitry 320 may not present audio to the user at all. Audio circuitry 320 may, instead, provide any type of media. For example, audio circuitry 320 may include a display console instead of speakers. In this manner, additional text, video, or pictures may be displayed to a user. Such media would preferably be associated to a page, or light sensor, in the same was a an audio segment has been herein described.

Memory 330 may be included in housing 310 to store any number of media segments (e.g., audio segments or movie segments). Memory 330 may be accessed using any known technique. Memory 330 may be partitioned in blocks such that each block is associated to a light sensor, array of light sensor, page, or pair of pages. Variably, control circuitry 310 may contain references to where a media segment for a particular page is located on memory 330. Memory 330 may be played by control circuitry 310, for example, by simply enabling the desired portion of memory to be read, converting that portion into an appropriate signals, and streamed into audio circuitry 320 at an appropriate rate.

As mentioned above, page 350 may contain any number of light sensors or other electrical components. For example, page 360 may contain any number of photodiodes 360, phototransistor 370, photoresistor 380, or LED 390. Persons skilled in the art will appreciate that photodiode 360 may also be a solar cell or photocell, and photodiode 360 may be in either a photovoltaic or photoconductive configuration.

Photodiode 360 may be included on page 350 to determine the amount of light on page 350 or a portion of page 350. In one embodiment, photodiode 360 may be given a power voltage at terminal 362 by control circuitry 310. Control circuitry 310 may then read the amount of current from terminal 361. The amount of current from terminal 361 is dependent upon the amount of light impinging the active region of photodiode 360. In this manner, control circuitry 310 can determine which photodiode, or groups of photodiodes, are receiving the most light.

Phototransistor 370 may be included on page 350 to determine the amount of light on page 350 or a portion of page 350. In one embodiment phototransistor 370 may be supplied a power voltage to terminal 372 by control circuitry 310. The amount of current provided to control circuitry 310 by terminal 373 would then be dependent on the intensity of light 371.

Photoresistor 380 may be included on page 350 to determine the amount of light on page 350 or a portion of page 350. Terminal 382 of photoresistor 380 may be supplied, for example, by a voltage signal from control circuitry 310. The resistance of photoresistor 380 is dependent upon the amount of light that photoresistor 380 is exposed to. In this manner, the amount of current supplied to control circuitry 310 by terminal 381 will be dependent upon the amount of light that photoresistor 380 is exposed to.

LED 390 may also be powered by control circuitry 310 at terminals 391 and 392 such output devices could enhance the whimsical and festive nature of a talking book. For example, if light buttons (as discussed in book 600 of FIG. 6) were incorporated into page 350 then an LED could light up depending on which light button was pressed (e.g., covered up). For example, suppose that page 350 contained a question with four answers and that each answer had a corresponding light button. Now, two LEDs 390 may be incorporated onto page 350 where one was green and one is red. If the user presses the right light button (i.e., answers the question correctly) then an appropriate LED may light up on page 350 (e.g., the green LED).

Persons skilled in the art will appreciate that the light sensors and electrical components that may be placed on page 350 may be electrically coupled, and utilized by control circuitry 310, in many different configurations and may employ a variety of other sensing techniques. As per one example, a resistor may electrically coupled to terminal 361 of photodiode 360. Terminal 361 may be coupled to control circuitry 310. The opposite terminal of this resistor may then be coupled to ground. Thus, control circuitry 310 is provided a voltage signal from page 350 instead of a current signal.

Figure 4:
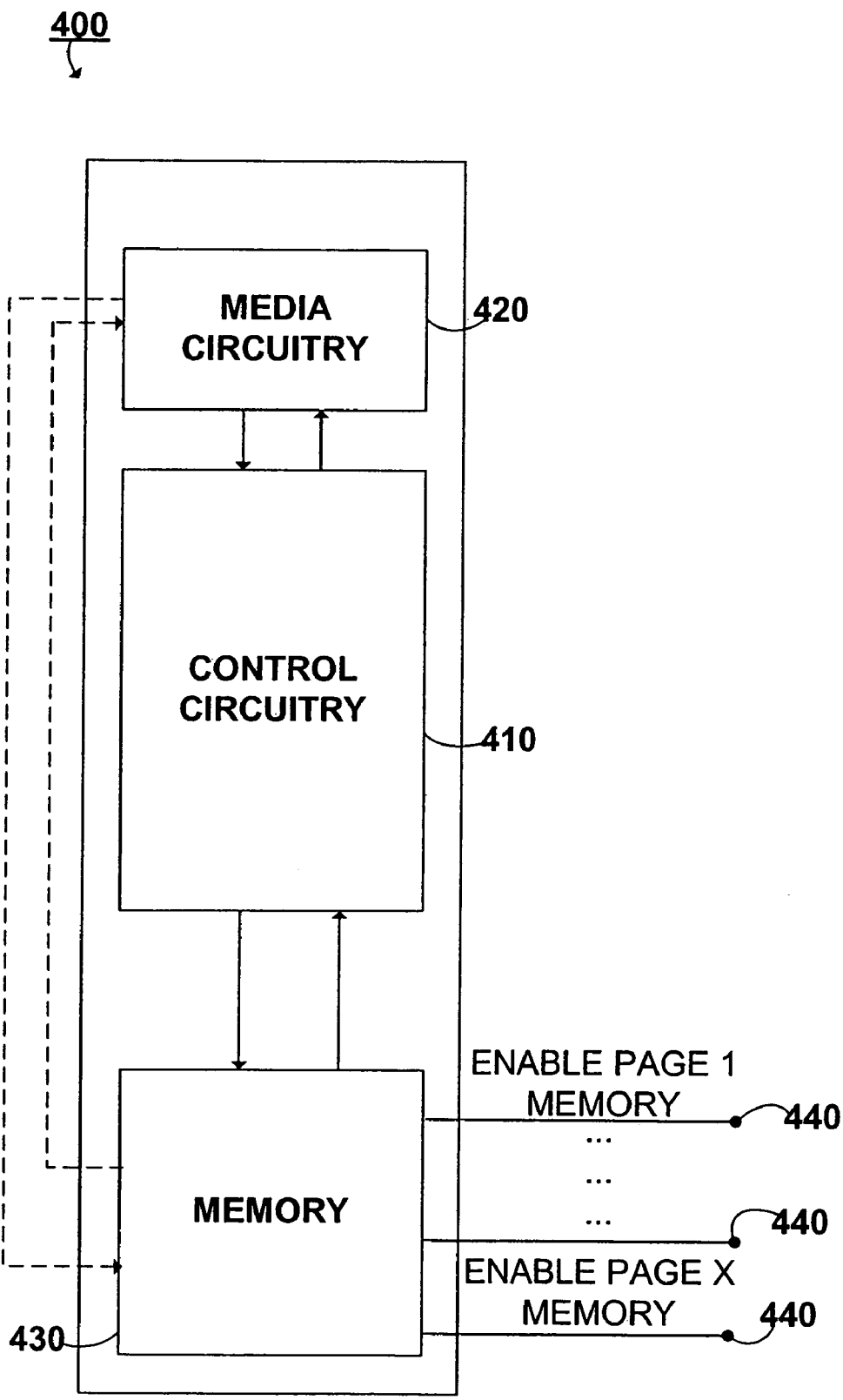
FIG. 4 is an electronic architecture for a talking book utilizing photo sensor readings as memory enabling signals constructed in accordance with the principles of the present invention.

Turning now to FIG. 4, electronic architecture 400 is depicted that utilizes light sensor readings as direct memory enabling signals. Light readings from the light sensors of the talking book may be directly used to enable specific memory blocks so that media may be played from audio circuitry 420 through, if necessary, controlling circuitry 410. One advantage of electronic architecture 400 is that control circuitry 410 may not be needed, thus decreasing the cost of manufacturing a talking book.

More particularly, memory 430 may be configured such that when a block of memory receives an appropriate signal (e.g., a light reading of a desired intensity) from a light sensor, that block of memory 430 is streamed, at an appropriate rate, to media circuitry 420. In this embodiment, light sensors may be coupled to memory 430 instead of control circuitry 410.

Figure 5:
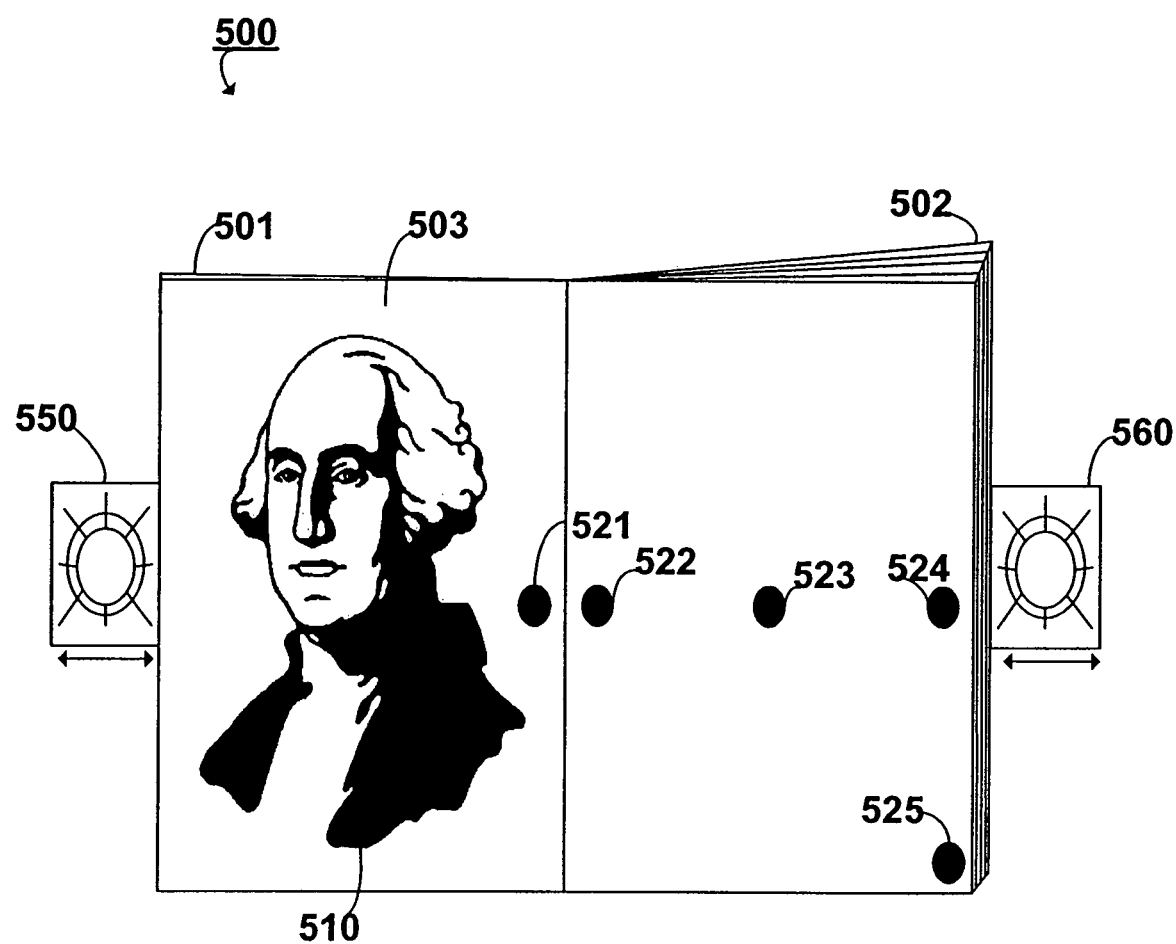
FIG. 5 is a talking book depicting illustrating various photo sensor locations and increased page image size constructed in accordance with the principles of the present invention.

FIG. 5 depicts talking book 500 that includes various light sensor locations and increased page image size. Talking book 500 depicts a few of the locations that light sensors may be placed. More particularly, An array of light sensors 522–525 may, for example, be included on each page or set of pages in order to obtain a better reading of the light falling on a particular page, or set of pages, of a talking book. More particularly, light readings from all of the light sensors included in an array may be averaged together (e.g. by control circuitry 310 of FIG. 3) to obtain a more accurate reading of the amount of light falling on that page.

Variably, as described above, a single light sensor 521 may be located on a page. As depicted as light sensor 521, a single light sensor is preferably close to the spine and in the middle of the page. This location is a preferred location because the page that light sensor 521 is located on would have to be substantially open in order for light sensor 521 to read any significant amount of light. Additionally, if the control circuitry is located in the spine of book 500, cover 501, or cover 502, a minimum amount of wiring would be needed to interconnect light sensor 521 to the control circuitry.

Talking book 500 may have increased functionality if talking book 500 is properly configured to take advantage of the light sensing attributes described above. For example, no text is needed in talking book 500 as long as the information contained in the text is also contained in an associated audio segment. Furthering this example, if the text is removed from the page, the pages may take on additional functionality by incorporating additional information. As shown in talking book 500, text is removed from page 503 to be replaced by picture 510 that substantially fills page 503.

The above technique may be especially advantageous in art books where conventional art books have small images due to large descriptions. As a result, one embodiment of the present invention could be an art book with full-page illustrations. Information about such illustrations would preferably be communicated through audio that is automatically played when a user reads a page (e.g., a page is OPEN). In doing so, a larger amount information may be included in this aaudio segment then could be placed on page 503 as text.

Furthering the above example, the book may be an art book for a specific museum painting collection where each page has a single painting on it. The audio may be associated to the museum's tour of that collection. Therefore, if a user turns to the last page of the book and that page depicts the last picture of the collection, the last page will autonomous be recognized as being open and the tour audio segment associated to that painting may be played to the user. This would be beneficial over art collection tour videos in which you can't control the duration, magnification, or angle that you view a painting.

Talking book 500 also includes speakers 550 and 560. Speakers 550 and 560 may be extendable from book covers 501 and 502, respectively. If more than one speaker is utilized on a talking book, the speaker may be associated to different audio segments or present audio segments differently. For example, if the talking book is a play and the text is that of a two person conversation each speaker may be designated to play the speech from one of these persons. As per another example, left speaker 550 may output the left channel of an segment file while right speaker 560 may output the right channel of the same audio file. Persons skilled in the art will appreciate that other speaker configurations may be employed in talking book 500.

Figure 6:
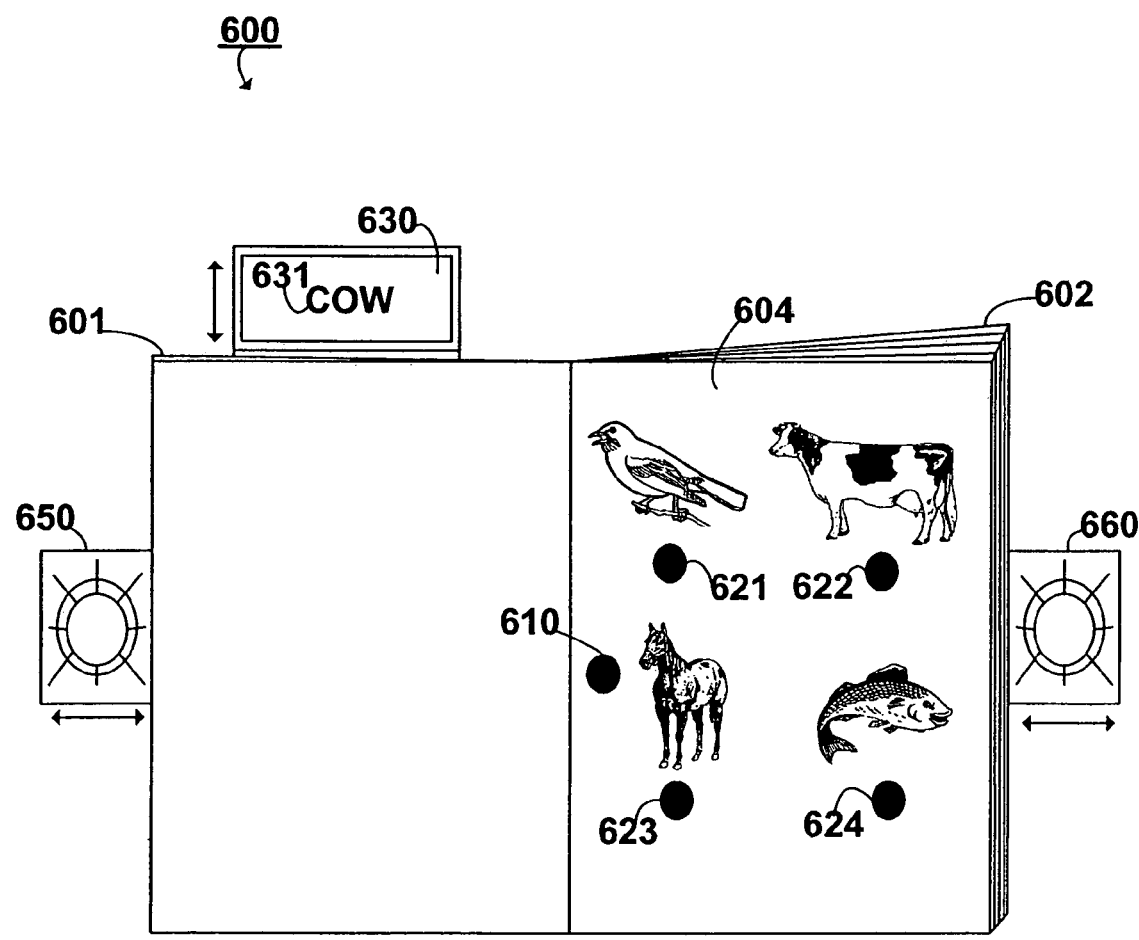
FIG. 6 is a talking book employing light sensing buttons constructed in accordance with the principles of the present invention.

Looking now at FIG. 6, interactive talking book 600 is depicted that employs light sensing buttons which allow a user to interact with a page of talking book 600. Particularly, light sensors may be utilized for other functions in addition to autonomous page sensing. In some embodiments, light buttons may be incorporated onto a page such that an audio clip, or other type of media, is triggered when no light is sensed in those instances when light is supposed to be sensed.

More particularly, light buttons 621–624 may be utilized to sense light after light sensor 610 has determine that page 604 is OPEN. Light buttons 621–624 may then act to provide the same functionality as mechanical buttons such that if a child covers a light button, an associated action may occur. For example, suppose that a cow is associated to light button 622. In this example, if a child covers light button 622 and light button 622 is not exposed to light, then an associated action may occur. As associated action may be playing the sound of a cow through speakers 650 and 660 or text 631 appears on display 630. In this manner, interactive talking book 600 may be utilized as an educational and learning toy. Light buttons 621–624 may be electrically coupled to control circuitry in the same manner as a light sensor is coupled to the control circuitry. For example, a light button may be similar to photodiode 360, phototransistor 370, or photoresistor 380 of FIG. 3 and coupled to control circuitry 310 of FIG. 3. Control circuitry 310 may be configured to distinguish which light sensors are being utilized as light buttons and which light sensors are being utilized to determine which page, or pair of pages, is OPEN.

Persons skilled in the art will appreciate that additional components may be included on page 604. For example, temperature sensor may be placed on page 604 instead of light buttons 621–624.

As mentioned, display screen 630 may be included on talking book 600 and may be utilized to display video signals in addition to or instead of audio signals for each page. Display screen 630 may include speakers and control buttons to manipulate the display of the media played (e.g., contrast, brightness, speed).

As per one example, suppose that talking book 600 pertains to the best 100 films of all time where each opened page, or pair of pages, is associated to one of these 100 best films. If the movie "Treasure Hunters" is turned to then a trailer, or video segment, from "Treasure Hunters" may be displayed on display screen 630. Preferably display screen 630 is extendable from either book cover 601 or 602 or the binding of talking book 600.

As per another example, suppose a talking book pertains to the best 100 video games of all time where each opened page, or pair of pages, is associated to one of these 100 best video games. Controls may be included on or extend from talking book 600 so that a level or segment of each video game may be played when the page associated to that game is turned to.

Figure 7:
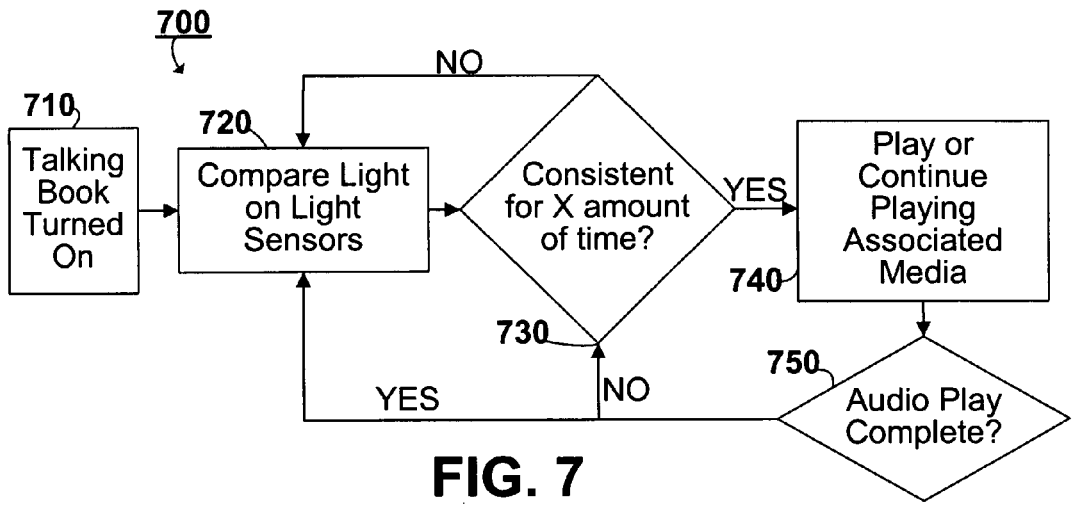
FIG. 7 is a flow chart of an autonomous page recognition process constructed in accordance with the principles of the present invention.

FIG. 7 depicts process 700 utilized in an autonomous page recognition system constructed in accordance with the principles of the present invention. Process 700 may initiate with step 710 when a talking book is turned ON. Step 702 then compares the light on the light sensors located throughout the talking book. Step 730 determines what light sensor is reading the most light and determines if this signal has been approximately consistent (e.g., reading the most light) for a particular amount of time (e.g., approximately 3 seconds). If the light sensor, or the average light reading from an array of light sensors, reading the most light is not consistent for the particular amount of time then step 720 is repeated.

Persons skilled in the art will recognize that for a signal to be consistent it may only need to be reading light while the other light sensing signals are not reading light. If the signal remains constant then step 740 occurs and the audio, or media, associated with the light sensor sensing the most light is played. Step 750 checks to see if the audio is complete and, if so, returns to step 720 to check for a new page, else step 730 (or 750) may be repeated so that the audio may continue playing.

Additionally, a step may be included to delay utilizing the amount of light sensed by light sensors after audio play has been determined as completed by step 750 in order to give the user time to turn the page. Such a step would be especially useful in a talking book that can be read, or requires the book to be read, by reading the pages non-consecutively.

Figure 8:
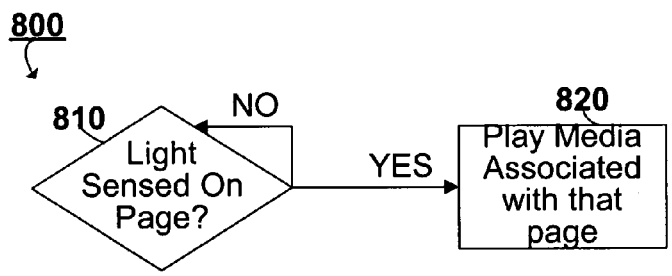
FIG. 8 is a flow chart of an autonomous page recognition process constructed in accordance with the principles of the present invention.

FIG. 8 depicts process 800 that may be utilized in an autonomous page recognition system constructed in accordance with the principles of the present invention. Process 800 is initiated by step 810 that senses to see if a page is opened (e.g., a page is exposed to light). If so, step 820 commences and plays media associated to the page, or pair of pages, sensed in step 810.

Figure 9:
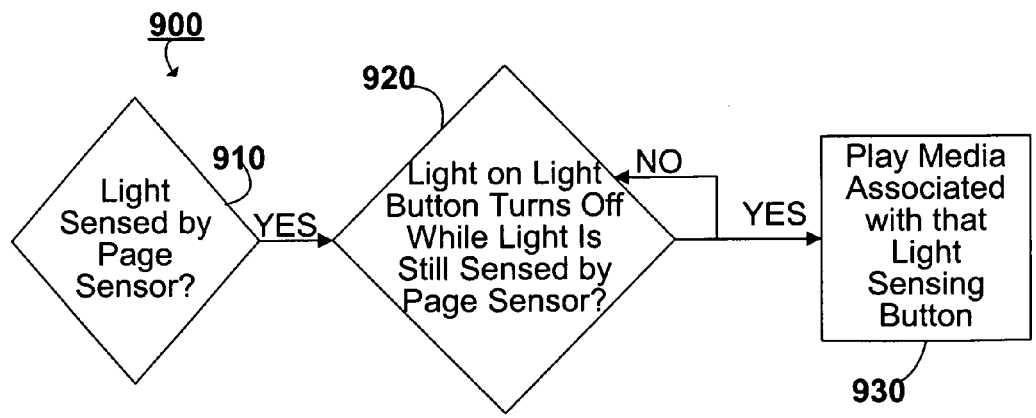
FIG. 9 is a flow chart of a light sensor button recognition process constructed in accordance with the principles of the present invention.

FIG. 9 depicts process 900 that may be employed in a system with light sensing buttons. Process 900 is initiated by step 910 that senses to see if a page is opened (e.g., a page is exposed to light). If so, step 920 commences to see if a light button is pressed. If so, step 920 occurs and media associated to that light button is presented to the user. Otherwise, step 920 is repeated.

Persons skilled in the art will appreciate that additional steps may be included in processes 700, 800, and 900 of FIGS. 700, 800, and 900, respectively. For example in process 900 of FIG. 9, media may, in addition to being associated with a light button, be associated to a page. Therefore, media associate with the page sensing the most light may be played in step 910, during or after which media may be played associated to the activation of a light button.

Figure 10:
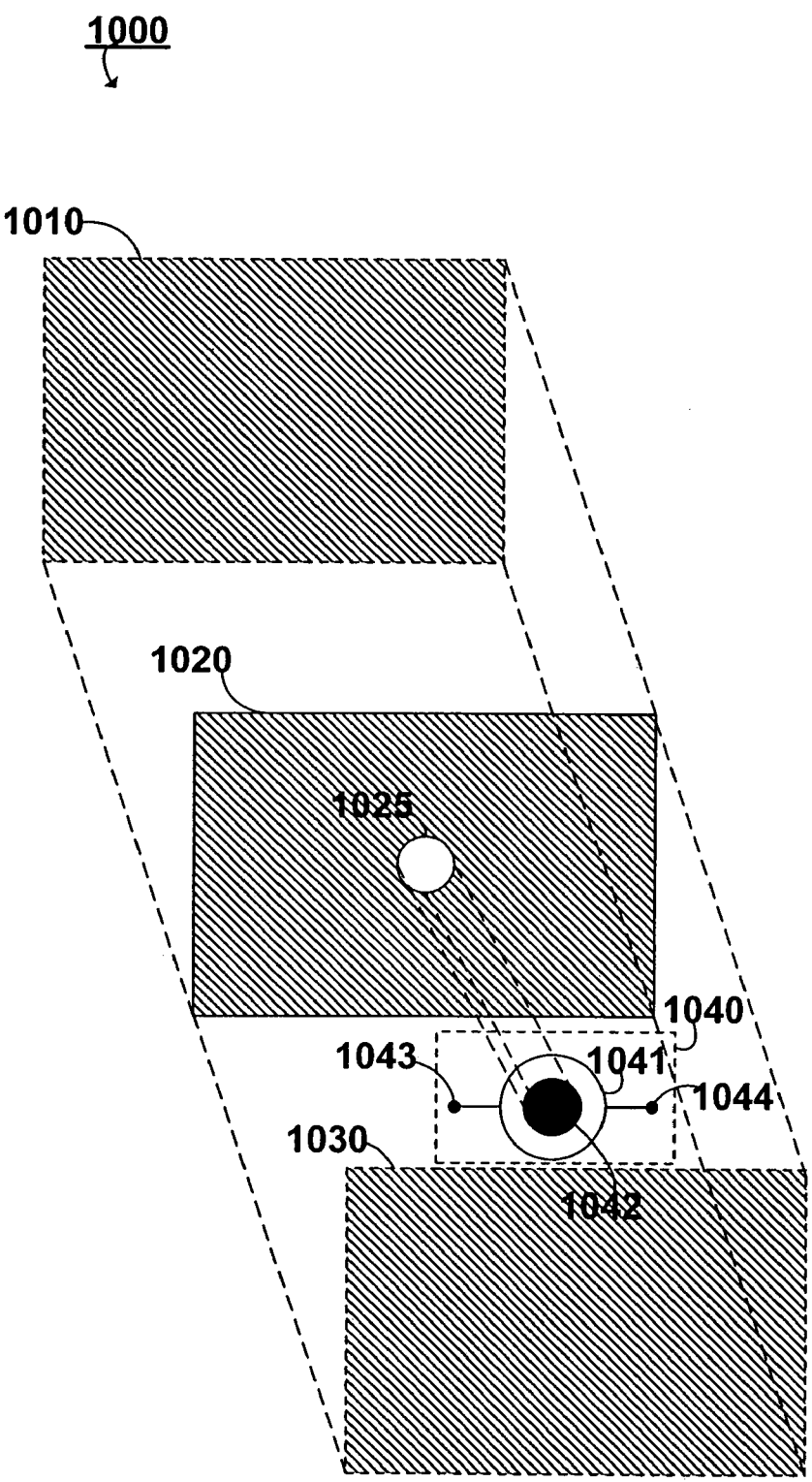
FIG. 10 is an illustration of one embodiment of how a light sensor may be affixed to a page constructed in accordance with the principles of the present invention.

Turning now to FIG. 10, page layout 1000 is shown. Page layout 1000 includes one embodiment of how light sensor 1040 may be attached to page 1020. In the illustrated embodiment, hole 1025 is cut in page 1020 that is the same size as active region 1042 of light sensor 1040. Light sensor 1040 has, in the depicted embodiment, a physical housing 1041 from which active region 1042 extends from. Light sensor 1040 may be attached to page 1020 by placing active region 1042 through hole 1025 and using an adhesive (e.g., a glue) on the side of physical housing 1041 facing page 1025.

Page 1030 may be used to better secure light sensor 1040 to page 1025. An adhesive may be used to affix page 1030 to page 1025. Page 1030 may also provides insulation for wires 1043 and 1044.

Page 1010 may also be affixed to the top of page 1020 to support the weight of light sensor 1040 on page 1020. In such an embodiment, light sensor 1040 would preferably be able to sense light through page 1010 and any adhesive used that may be placed between active region 1042 and page 1010. Additionally, a hole, similar to hole 1025, may be included on page 1010. Such an embodiment would be advantageous if active region 1042 extends beyond physical housing 1041 by a thickness greater than page 1020. In this manner, page 1030 may include a hole that is approximately the size of physical housing 1041 such that a book containing page 1020 may be fully closed.

Persons skilled in the art will appreciate that light sensor 1040 may be attached to page 1020 in many ways. For example, light sensor 1040 may be constructed without physical housing 1041 and wires 1043 and 1044. Active region 1042 may then be embedded into page 1020 and metallic ink may be printed on page 1020 and appropriately connected to active region 1042 so that active region 1042 may be utilized.

Components of one of the talking book of the present invention may be removable and insertable into other talking books constructed with the principles of the present invention. For example, the memory of the talking book may be removable and insertable into other talking books. The information, media, or audio associated to the pages of a talking book may be stored in such a memory device. Removable memory may be used to decrease the price of multiple talking books since only one memory unit needs to be purchased. In this manner, a user could connect to the internet and download the appropriate media for a particular talking book.

Similarly, most of the electronic components of a talking book constructed in accordance with the principles of the present invention may be removable. If all the electronics, other than page light sensing, components, are located in the binding of the talking book then a portion of the binding may be removable. Such a binding portion could be compatible with a variety of similar talking books such that the talking book electronics (e.g., control and audio circuitry) are reused. Extending upon this feature of the present invention, a separate removable memory device may be included with each talking bookhand may be insertable into the removable electronic binding. Examples of memory that may be employed in the talking book of the present invention include, for example, flash, ROM, RAM, SRAM, DRAM, PROM EPROM, and EEPROM memory devices or other suitable volatile or non-volatile memory devices. Smart cards may also be utilized as memory devices.

The interior of each cover may also include pressure pads. Once a page is determined to be OPEN, the pressure pads could be configured to sense when a person presses down on a particular section of a page. As a result an interactive talking book could be realized, employing functions similar to that of talking book 500 of FIG. 5.

For talking books that take the form of novels, audio other than audio directly representative of the text of the book may be utilized. For example, in a novel of "Treasure Hunters", the soundtrack of "Treasure Hunters" may be selectively played according to the theme of the text contained on the pages (or chapters) that are currently being read by a user. Thus, when a fast-chase sequence is being read by a user, an associated fast-chase audio segment will be played to the user. Thus, persons skilled in the art will appreciate that the benefit provided to a user of a talking book of the present invention may be different depending on the type of audio or media segment provided to that user.

Methods may be employed to decrease the memory needed for audio or media segments to be stored. For example, music compression may be utilized. As per another example, text may be stored in the memory of a talking book that is directly associated to the text of a page or a portion of a page. A voice synthesizer may then be included in the talking book that can translate digital text into speech. In doing so, the amount of memory needed to store speech will be decreased.

Persons skilled in the art will also appreciate that the apparatus of the present invention may be implemented using other control methods, comparison techniques, sensing components (e.g., touch buttons and thermal buttons), and configurations. All such modifications are within the scope of the present invention, which is limited only by the claims that follow.

What is claimed is:

1. A system comprising:
   a book cover;
   a first page bound to said book cover wherein a first light sensor is located on said first page and said first light sensor provides a first control signal that is indicative of the amount of light shining on said first page;
   circuitry operable to utilize said first control signal to determine the amount of light sensed by said first light sensor; and
   a second page bound to said book cover.

2. The system of claim 1, further comprising a first media segment that is associated to said first page, wherein said first media segment is played dependent on said determination.

3. The system of claim 2, wherein said media segment is an audio segment, a video segment, or a text segment.

4. The system of claim 1, further comprising a second light sensor that is located on said second page that provides a second control signal indicative of the amount of light shining on said second page.

5. The system of claim 4, further comprising:
   a first audio segment that is associated to said first page; and
   a second audio segment that is associated to said second page, wherein said second audio segment is played by at least one speaker if said second light sensor senses light and said second light sensor senses more light than said first light sensor.

6. The system of claim 4, further comprising:
   a first audio segment that is associated to said first page, wherein said first audio segment is stored in a memory device; and
   a second audio segment that is associated to said second page and stored in said memory device, wherein said circuitry determines which of said first and second audio segments to play dependent upon said first and second control signals.

7. The system of claim 1, wherein said circuitry determines an average amount of light sensed by said first light sensor for a period of time.

8. A system comprising:
   a book cover;
   a plurality of pages bound to said book cover, each one of said plurality of pages having at least one page-recognition light sensing component; and
   control circuitry that is electrically coupled to said page-recognition light sensing components, wherein said control circuitry is operable to determine different amounts of light sensed by said page-recognition light sensing components and play a first media segment dependent on said determination.

9. The system of claim 8, further comprising an interaction light sensing component located on one of said plurality of pages, wherein said control circuitry is operable to determine to play a second media segment when no light shines on said interaction light sensing component.

10. The system of claim 8, wherein said first media segment comprises an audio segment.

11. A method comprising:
    providing a first control signal from a first light sensor located on a first page of a plurality of pages of a book to circuitry, wherein said first control signal is representative of an amount of light sensed by said first light sensor;
    providing a second control signal from a second light sensor to said circuitry, wherein said second control signal is representative of an amount of light sensed by said second light sensor; and
    determining to play a media segment based on said first and second control signal.

12. The method of claim 11, wherein said media segment is an audio segment.

13. The method of claim 11, further comprising:
    providing a third control signal from a third light sensor located on one of said plurality of pages of said book to said circuitry.

14. The method of claim 11, wherein said media segment comprises a video segment.

15. The method of claim 11, further comprising determining to play a second media segment based on a third light sensor not sensing light.

16. The method of claim 11, further comprising utilizing a light emitting diode based on a third light sensor not sensing light.

17. The method of claim 11, further comprising playing said media segment and toggling to a second media segment based on manual input.

18. The method of claim 11, wherein said media segment is played in an object external to said book.

19. A system comprising:
a book cover;
a plurality of pages bound to said book cover;
at least one light sensor, provided on at least one page of said plurality of pages, operable of providing at least one control signal representative of an amount of light sensed by said at least one light sensor;
memory storing a plurality of segments representative of text;
circuitry for converting at least one of said segments representative of text into an audio segment based at least in part on said at least one control signal; and
a speaker for playing said audio segment.

20. The system of claim 19 wherein at least one of said plurality of pages is determined as being open by, at least in part, said at least one control signal and any one or ones of said plurality of segments associated to said at least one opened page is converted into audio and played through said speaker.

21. A system comprising:
a plurality of pages bound together;
a light sensor provided on a page of said plurality of pages that provides a control signal representative of an amount of light sensed by said light sensor;
circuitry for determining, based at least in part on said control signal, which one, or ones, of said plurality of pages is being read;
memory storing a plurality of text segments;
a voice synthesizer for converting into speech at least one of said plurality of text segments based on said determination of which one, or ones, of said plurality of pages is being read; and
a speaker for playing said speech.

22. The system of claim 21, further comprising a manual input switch for turning said circuitry ON and OFF.

23. A system comprising:
a book cover;
a plurality of pages bound to said book cover, wherein a light sensor is located on a page of said plurality of pages and said light sensor provides a control signal that is indicative of the amount of light shining on said page;
circuitry for determining an average amount of light shining on said first page for a period of time based at least in part on said control signal;
memory, wherein a plurality of media segments are stored in said memory; and
a device, wherein said determination is utilized to determine whether to play at least one of said media segments with said device.

24. A system comprising:
a plurality of pages bound together to form a book;
circuitry for determining which one, or ones, of said plurality of pages is being read, wherein said determination is based at least in part on a control signal representative of an amount of light sensed by a light sensor provided on a page of said plurality of pages;
memory, wherein a plurality of video segments are stored in said memory; and
a display for displaying at least one of said video segments dependent on said determination of which one, or ones, of said plurality of pages is being read.

25. A system comprising:
a plurality of pages bound together;
circuitry for determining which one, or ones, of said plurality of pages is being read, wherein said determination is based at least in part on a control signal representative of an amount of light sensed by a light sensor provided on a page of said plurality pages;
memory, wherein a plurality of text segments are stored in said memory; and
a display for displaying at least one of said text segments dependent on said determination of which one, or ones, of said plurality of pages is being read.

26. A method comprising:
providing a first control signal from a first light sensor located on a first page of a plurality of pages of a book to circuitry, wherein said first control signal is representative of an amount of light sensed by said first light sensor;
utilizing said first control signal to determine an average amount of light over a period of time; and
determining to play a media segment based on said average amount of light.

27. The method of claim 26, wherein said media segment comprises audio.

28. The method of claim 26, further comprising providing a second control signal from a second light sensor located on a second page of said plurality of pages of said book.

29. The method of claim 26, further comprising providing a second control signal from a second light sensor located on a second page of said plurality of pages of said book, wherein said determining to play said media segment is also based on said second control signal.

30. The method of claim 26, wherein said media segment comprises a picture.

31. The method of claim 26, wherein said media segment comprises video.

32. The method of claim 26, wherein said media segment comprises text.

33. The method of claim 26, further comprising determining to play a second media segment based on a second light sensor not sensing light.

34. The method of claim 26, further comprising determining to play a second media segment based on a second light sensor not sensing light, wherein said second media segment comprises audio.

35. The method of claim 26, further comprising utilizing a light emitting diode based on a second light sensor not sensing light.

36. The method of claim 26, further comprising playing said media segment and toggling to a second media segment based on manual input.

37. The method of claim 26, further comprising:
playing said media segment, wherein said media segment comprises audio; and
changing the volume of said audio.

38. The method of claim 26, further comprising:
playing said media segment, wherein said media segment comprises audio; and
changing the speed of said audio.

39. The method of claim 26, further comprising:
playing said media segment, wherein said media segment comprises audio; and
changing the pitch of said audio.

40. The method of claim 26, wherein said media segment is played in an object external to said book.

41. The method of claim 26, wherein said media segment is played in an object external to said book and said object is a teddy bear.

42. A method comprising:
   determining different amounts of light sensed by a plurality of light sensors, wherein said plurality of light sensors are located on one or more pages of a book; and
   playing at least one media segment based, at least in part, on said determination.

43. The method of claim 42, wherein at least one of said at least one media segments comprises audio.

44. The method of claim 42, wherein at least one of said at least one media segments comprises a picture.

45. The method of claim 42, wherein at least one of said at least one media segments comprises video.

46. The method of claim 42, wherein at least one of said at least one media segments comprises text.

47. The method of claim 42, further comprising determining to play a second media segment based on a light sensor not sensing light, wherein said second media segment comprises audio.

48. The method of claim 42, further comprising utilizing a light emitting diode based on a light sensor not sensing light.

49. The method of claim 42, further comprising playing at least one of said at least one media segments and toggling to a second media segment based on manual input.

50. The method of claim 42, wherein said at least one media segment is played by media circuitry located in an object external to said book.

* * * * *